(12) United States Patent
Kolodin et al.

(10) Patent No.: US 8,064,058 B2
(45) Date of Patent: Nov. 22, 2011

(54) LIGHT DISTRIBUTION MEASUREMENT SYSTEM

(75) Inventors: Boris Kolodin, Beachwood, OH (US); Emil Radkov, Euclid, OH (US); Mark J. Mayer, Sagamore Hills, OH (US)

(73) Assignee: GE Lighting Solutions, LLC, Cleveland, OH (US)

( * ) Notice: Subject to any disclaimer, the term of this patent is extended or adjusted under 35 U.S.C. 154(b) by 395 days.

(21) Appl. No.: 12/173,092

(22) Filed: Jul. 15, 2008

(65) Prior Publication Data

US 2009/0021732 A1  Jan. 22, 2009

(51) Int. Cl.
*G01N 21/00* (2006.01)
(52) U.S. Cl. ............. 356/432; 250/227.28; 250/227.32; 356/324; 356/122; 356/121; 385/12; 385/24
(58) Field of Classification Search ............ 250/227.28–227.32; 356/121, 122, 324–326; 385/12, 16–18, 24
See application file for complete search history.

(56) References Cited

U.S. PATENT DOCUMENTS

| 5,387,977 A * | 2/1995 | Berg et al. ............ 356/407 |
| 7,224,000 B2 * | 5/2007 | Aanegola et al. ........ 257/98 |
| 2009/0213120 A1 * | 8/2009 | Nisper et al. ............ 382/165 |

OTHER PUBLICATIONS

SIG-300™ Source Imaging Goniomoeter brochure; Radiant Imaging, Inc.

* cited by examiner

*Primary Examiner* — Gregory J Toatley
*Assistant Examiner* — Iyabo S Alli
(74) *Attorney, Agent, or Firm* — Fay Sharpe LLP

(57) ABSTRACT

A disclosed optical testing apparatus comprises: a plurality of optical fibers, each optical fiber having a collection end in optical communication with an output end; and a support member supporting the collection ends of the optical fibers so as to simultaneously view an examination region from different angles. A disclosed optical testing apparatus comprises a plurality of optical fibers having collection ends arranged to simultaneously view an examination region from a plurality of different angles. A disclosed optical testing apparatus comprises a plurality of optical fibers, each optical fiber having a collection end, the collection ends of the optical fibers arranged in fixed spatial relationship respective to one another to simultaneously view an examination region from different angles.

33 Claims, 4 Drawing Sheets

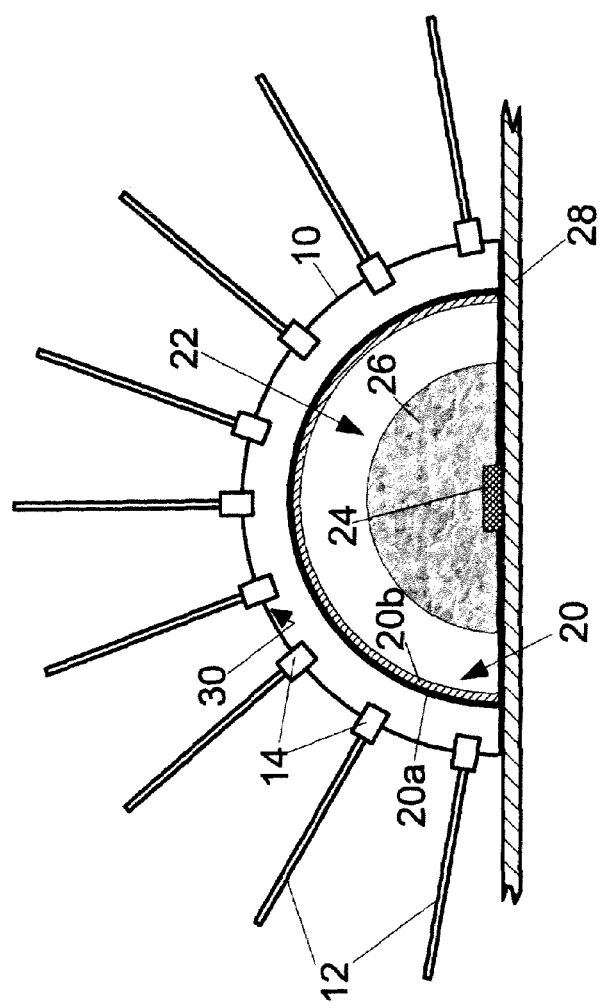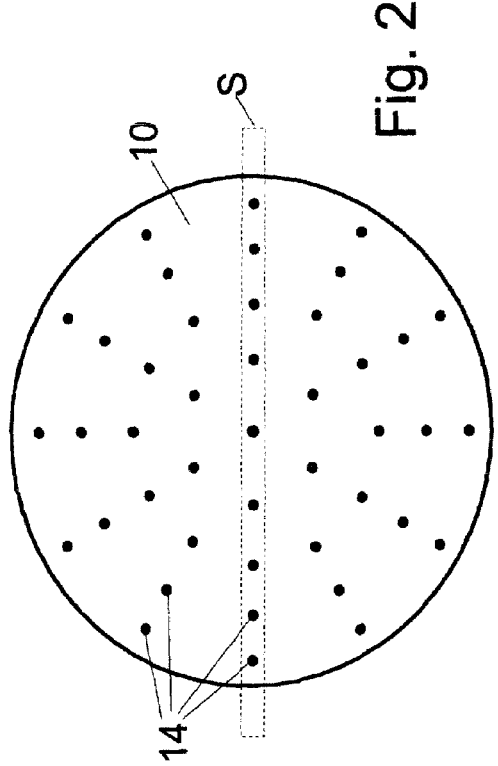

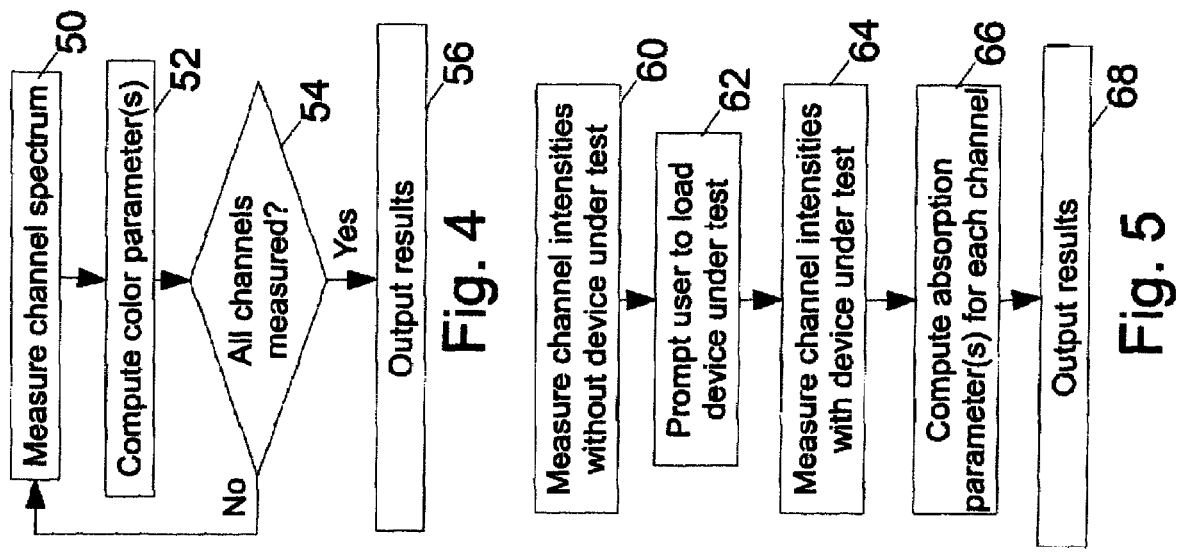
Fig. 4
Fig. 5
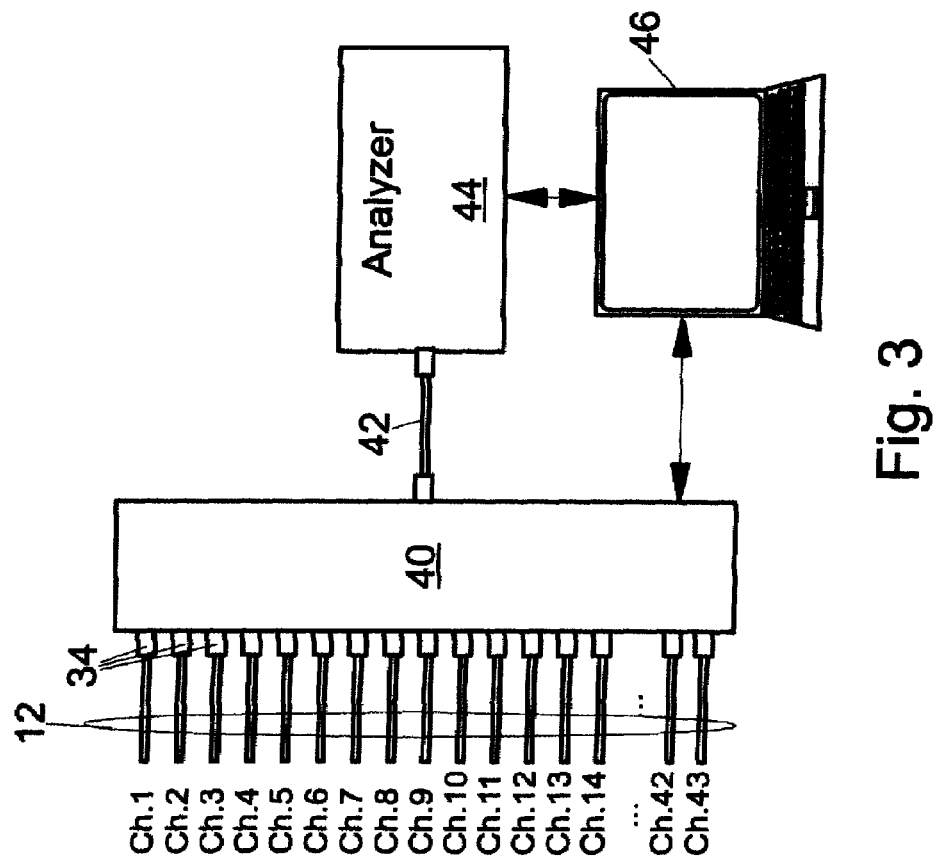
Fig. 3

US 8,064,058 B2

LIGHT DISTRIBUTION MEASUREMENT SYSTEM

BACKGROUND

The following relates to the optoelectronic arts. It finds particular application in testing angular distribution of light generated by light emitting devices such as phosphor-coated light emitting diode (LED) based devices, or light processed by optical components such as phosphor coated domes, lenses, frosted diffusion domes, and so forth. The following will find more general application in conjunction with testing spatial distributions of light generated by light sources or processed by optical components.

A characteristic of a wide-angle light source or optical component that is sometimes of interest is the angular distribution of light generated by the light source or processed by the optical component. For example, a conventional light emitting diode chip typically emits in a generally Lambertian pattern, in which the intensity at the sides is substantially decreased compared with intensity directly in front of the chip. In some applications a more hemispherically uniform output is desired. One approach for achieving such an output is disclosed in U.S. Pat. No. 7,224,000 which discloses, in some illustrated embodiments, a light source including one or more blue, violet, or ultraviolet light emitting diode chips mounted on a circuit board and covered by a phosphor-coated dome. The phosphor converts the direct chip radiation to a desired output, such as white light. Since this conversion occurs across the surface of the dome, a more hemispherically uniform light output is generated by the light source. Other approaches for achieving more hemispherically uniform light output include epoxy encapsulation, use of microlenses, and so forth. Moreover, in some applications a Lambertian or other angular distribution may be desired. Thus, it is desirable to have a rapid and effective way to characterize the angular distribution.

In one approach, a camera acquires images of the operating light source, or of the optical component under test in its usual operative arrangement. By acquiring images at several different viewing angles, the angular distribution can be extrapolated. This approach entails substantial post-acquisition image analysis to extrapolate the three-dimensional angular distribution from the two-dimensional acquired images. Such extrapolation, light diffraction in the imaging optics, or other factors, can adversely affect the extrapolated angular distribution.

A more elaborate version of this approach is employed by the SIG-300™ Source Imaging Goniometer (available from Radiant Imaging, Duvall Wash.). This apparatus captures uses a goniometer configuration to acquire images and flux measurements from thousands of angular viewpoints around the source. Other goniometer-based apparatuses employ a single point detector. Such apparatuses can provide more data from which to extrapolate the angular distribution. However, the goniometer is a complex mechanical device which mechanically changes the angular position of the camera or detector prior to each measurement. As a result, such apparatuses are relatively slow, and can be subject to mechanical failures.

BRIEF SUMMARY

In accordance with certain illustrative embodiments shown and described as examples herein, an optical testing apparatus is disclosed, comprising: a plurality of optical fibers, each optical fiber having a collection end in optical communication with an output end; and a support member supporting the collection ends of the optical fibers so as to simultaneously view an examination region from different angles.

In accordance with certain illustrative embodiments shown and described as examples herein, an optical testing apparatus is disclosed, comprising a plurality of optical fibers having collection ends arranged to simultaneously view an examination region from a plurality of different angles.

In accordance with certain illustrative embodiments shown and described as examples herein, an optical testing apparatus is disclosed, comprising a plurality of optical fibers, each optical fiber having a collection end, the collection ends of the optical fibers arranged in fixed spatial relationship respective to one another to simultaneously view an examination region from different angles.

In accordance with certain illustrative embodiments shown and described as examples herein, an optical testing apparatus is disclosed, comprising a plurality of optical fibers, each optical fiber having a collection end, the collection ends of the optical fibers arranged in fixed spatial relationship respective to one another and further arranged to conform with a surface whose light output is to be measured.

In accordance with certain illustrative embodiments shown and described as examples herein, an optical testing method is disclosed, comprising: arranging a light sampling structure to view an examination region simultaneously from a plurality of different angles, the light sampling structure including a plurality of optical fibers, each optical fiber having a collection end for viewing the examination region at a different angle, the collection ends of the optical fibers being arranged in fixed spatial relationship respective to one another; and acquiring light samples from the examination region at different angles using the collection ends of the optical fibers.

Numerous advantages and benefits of the present invention will become apparent to those of ordinary skill in the art upon reading and understanding the present specification.

BRIEF DESCRIPTION OF THE DRAWINGS

The drawings are only for purposes of illustrating preferred embodiments and are not to be construed as limiting. Unless otherwise indicated, the drawings are not drawn to proportion or scale.

FIGS. 1-3 illustrate an optical characterization apparatus. FIG. 1 diagrammatically depicts a sectional slice view of a support member for the collection fiber ends with portions of some of the collection optical fiber ends, disposed over a device-under-test. FIG. 2 diagrammatically depicts an overhead view of the support member with the optical fiber ends diagrammatically indicated by filled circles. FIG. 3 diagrammatically depicts the multiplexing, optical detection and processing components.

FIG. 4 diagrammatically shows processing flow using the apparatus of FIGS. 1-3 and measuring phosphor emission.

FIG. 5 diagrammatically shows processing flow using the apparatus of FIGS. 1-3 and measuring phosphor absorption.

Figure 6:
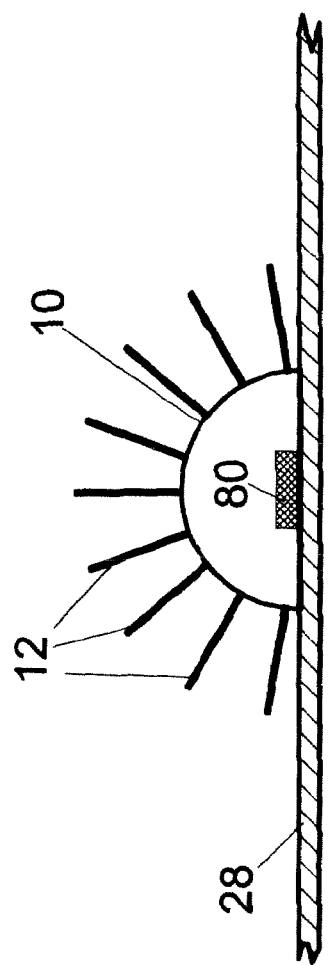
FIG. 6 diagrammatically depicts a sectional slice view of a support member for the collection fiber ends with portions of some of the collection optical fiber ends, disposed over a light emitting diode chip under test.

Inset diagrammatically depicts an overhead view of the support member of the test apparatus with the locations of the nine optical fiber ends diagrammatically indicated.

DETAILED DESCRIPTION OF PREFERRED EMBODIMENTS

With reference to FIGS. 1-3, an optical testing apparatus includes a support member 10, which in the illustrated embodiment comprises a hemispherical wall, although other geometries are contemplated including other portions of a sphere, non-spherical geometries, and so forth. In FIG. 2, an overhead view of the hemispherical support member 10 is shown, while FIG. 1 shows the sectional slice S indicated in FIG. 2 and further including the device under test. The optical testing apparatus also includes a plurality of optical fibers 12 having collection ends 14 that are supported by the support member 10 to view an examination region in which is disposed a component under test, such as a light source, a lens, a frosted glass, or so forth. In FIG. 2, only the collection ends 14 of the fibers are indicated diagrammatically by filled circles, to illustrate that the set of collection ends 14 span a hemispherical portion of a sphere. In the illustrated embodiment, the component under test is a phosphor covered dome 20 including a glass, plastic, or other light-transmissive hemispherical member 20a coated on the inside with a phosphor coating 20b. The phosphor covered dome 20 has application, for example, in light sources such as those disclosed in U.S. Pat. No. 7,224,000 which is incorporated herein by reference in its entirety.

The collection ends 14 are arranged in a fixed relationship to one another to view the examination region, and more particularly in the specific embodiment of FIG. 1 to view the surface of the phosphor covered dome 20 under test. Because the phosphor covered dome 20 is an optically passive element that does not generate light by itself, a light source 22 is provided in the examination region such that the phosphor covered dome 20 under test is disposed between the light source 22 and the collection ends 14. If the component under test is a light source, such as one of the complete light sources disclosed in U.S. Pat. No. 7,224,000 which is incorporated herein by reference in its entirety, then the light source 22 may be omitted. (In effect, the light source 22 is replaced by the light emitting chip of the light source disclosed in U.S. Pat. No. 7,224,000). Other examples of passive optical components that may be tested include refractive lenses, frosted covers, and so forth. Other examples of light sources that may be tested include bare light emitting diode chips, light emitting diode packages including epoxy-encapsulated chips, and so forth.

In some embodiments, the collection ends 14 are about two millimeters or less away from the surface of the component 20 under test. Where this surface is a light emitting surface (such as the phosphor layer of the dome, which emits light responsive to irradiation by the light source 22) and the collection end-to-surface distance is about two millimeters or less, the collection ends acquire near field light samples. In the art, the term "near field" sometimes refers to light acquired within about one wavelength away from the light-emitting surface. For visible light, the wavelength is in a range of about 0.4-0.7 microns. However, as used herein, acquisition of a light sample with the collection end 14 within about two millimeters or less of the light emitting surface is referred to as acquisition of a near field light sample. This is because the light sample acquired from a distance of about two millimeters or less is close enough to provide a suitable approximation of a sample in which the distance is within about one wavelength. Also, as used herein, the term "light" is to be broadly construed as encompassing visible light and also ultraviolet or infrared light.

In some embodiments, the collection ends 14 are greater than about two millimeters away from the surface of the component 20 under test. In such cases, the acquired light samples are far field light samples or are some intermediate between far field light samples and near field light samples.

An objective of the testing performed using the apparatus of FIGS. 1-3 is to determine uniformity of the phosphor coating of the phosphor coated dome 20 under test. Accordingly, it is useful for the excitation light produced by the light source 22 to be isotropic, that is, to be substantially uniform over at least an angular range of sampling, specifically over the hemispherical angular range of sampling in the example illustrated in FIGS. 1-3. To achieve uniform light output, the light source 22 includes a light emitting semiconductor device 24 (such as a light emitting diode chip, or an organic light emitting diode, or so forth), a light transmissive encapsulant 26 (such as silicone, epoxy, or so forth) substantially surrounding the light emitting semiconductor device, and optical dispersion particles (not illustrated, for example micron-sized particles of titanium dioxide or another highly reflective material) dispersed in the light transmissive encapsulant 26. In the embodiment illustrated in FIG. 1, a substrate 28 provides support for both the light source 22 and the phosphor covered dome 20 under test.

The collection ends 14 of the optical fibers 12 are arranged in fixed spatial relationship respective to one another and are arranged to view the examination region. The collection ends 14 can take various forms. In some embodiments, the optical fibers 12 are single-mode fibers with optical cores of 5-10 microns diameter, and the collection ends 14 are formed by cleaving, end polishing, or other techniques. In some embodiments, the optical fibers 12 are multi-mode fibers with larger optical cores, for example of order tens or hundreds of microns, or even as large as one or a few millimeters in diameter, and the collection ends 14 are formed by cleaving, end polishing, or other techniques. In some embodiments, the collection ends 14 are polished fiber ends without any additional components or features. In some embodiments, it is contemplated for the collection ends 14 to include an additional components or features such as an attached optical coupling element. In some embodiment, it is contemplated for the collection ends 14 to be melted or thermally or otherwise distorted to form a lensing ball or other integral light coupling enhancement structure. The collection ends 14 can be secured in place on the support member 10 in various ways, such as by a mounting screw, a mounting collar, an adhesive (which optionally also contributes to optical coupling of the collection ends 14) or so forth. To limit stray light, the support member 10 preferably has a surface 30 facing the examination region that is substantially absorbing, or at least substantially non-reflective, for light of interest. In the illustrated embodiment, the hemispherical support member 10 cooperates with the substrate 28, which is also preferably opaque for light of interest, to define a substantially light-tight container except for light that is collected by the collection ends 14 and transmitted away by the fibers 12. In some embodiments, the illustrated hemispherical support member 10 is a hemispherical aluminum shell with openings for receiving the collection ends 14, and the inside surface of the hemispherical aluminum shell is anodized to enhance light absorption and suppress light reflection by the inner surface.

Each collection end 14 collects light that is transmitted by the corresponding optical fiber 12. Thus, each optical fiber 12 can be considered to be a light sample collection channel corresponding to a particular angular direction respective to the examination region. In the embodiment shown in FIG. 2, there are forty-three collection ends 14, and a corresponding forty-three collection channels. The number of collection ends 14 can be substantially any number sufficient to provide an adequate sampling of the angular range of interest. In some embodiments, this angular range may be a one-dimensional angular range such as an arc. In some embodiments, the angular range may be a solid angular range such as the hemispherical angular range of the illustrative apparatus shown in FIGS. 1 and 2. The collection ends 14 are preferably arranged to be substantially transverse to the surface of the component 20 under test in the vicinity of the support surface 10, as shown in FIG. 1. It will be appreciated that the optical fibers 12 are generally flexible, and may bend and turn in various manners away from the collection ends 14. In some embodiments, the optical fibers 12 are bundled together to form a single cable of (in the illustrated embodiment) forty-three optical fibers for convenient routing.

With particular reference to FIG. 3, the optical fibers 12 each have an output end 34 opposite the collection end 14. Each optical fiber 12 defines an optical communication path (not shown) between the collection end 14 shown in FIGS. 1 and 2, and the corresponding output end 34 shown in FIG. 3. That is, a light sample collected by one of the collection ends 14 traverses the optical fiber and exits at the corresponding output end 34. In the embodiment shown in FIG. 3, the output ends 34 are input into channels of an optical multiplexor 40 that transits the light sample carried by a selected one of the optical fibers 12 to a multiplexor output optical fiber 42. An analyzer 44 receives transmitted light from the selected output end 34. That is, the analyzer 44 receives the light sample selected by the optical multiplexor 40 via the output optical fiber 42. The analyzer 44 is configured to generate at least one datum based on the received transmitted light sample. For example, the analyzer 44 may be an optical detector such as a photodiode or photomultiplier tube, and the at least one datum is an electrical signal generated by the photodiode or photomultiplier tube corresponding to an intensity of the light sample as detected by the photodiode or photomultiplier tube. In other embodiments, the analyzer 44 may be a spectrometer, and the at least one datum is a set of data indicative of the spectrum of the received light sample.

A controller 46 controls operation of the apparatus. In the illustrated embodiment, the controller 46 is a suitably programmed computer or other hardware that executes software that causes the optical multiplexor 40 to transmit light from different output ends 34 of the plurality of optical fibers 12 to the analyzer 44 at different times for analysis. For example, in the illustrated embodiment the controller 46 successively acquires light samples from the examination region using successive different collection ends 34, the successive acquiring being performed until a light sample has been acquired and analyzed using each of the forty-three collection ends 34 so as to sample all the different directions provided by the forty-three fibers 12.

The illustrated embodiment employs the multiplexor 40 to enable the same analyzer 44 to process all the different channels provided by the different optical fibers 12. In other embodiments, it is contemplated to provide a separate analyzer for each channel, that is, for each optical fiber, in which case the multiplexor is optionally omitted. Moreover, in such embodiments the data from all the different channels, that is, from all the different optical fibers, may be acquired and analyzed simultaneously.

The apparatuses disclosed herein provide certain advantages. They are mechanically non-complex, as no goniometer and little or no other positioning equipment is implicated in positioning the collection ends 14. Reproducibility, for example in a manufacturing environment, is promoted because each component is tested using the same array of collection ends 14 having the same fixed spatial arrangement respective to one another. Tests performed at different fabrication facilities or at other different locations can be made readily comparable by using substantially identical copies of the same collection apparatus comprising the support member 10 and collection ends 14. Standardization to enable such cross-comparisons is facilitated since it is possible to machine or otherwise fabricate the support member 10 in a reproducible fashion so as to make multiple substantially identical copies of the support member 10 for use at different locations. Acquisition of light samples is rapid because there is no goniometric or other mechanical repositioning between light sample acquisitions. In some embodiments, it is contemplated for the optical multiplexor 40 to employ a mechanical selection mechanism. Such embodiments are typically fast because the array of output ends 34 can be arranged in any fashion that facilitates fast multiplexor switching. Additionally, any mechanical switching disposed at or with the multiplexor 40 does not adversely impact the accuracy or reproducibility of the angular positioning of the collection ends 14. Moreover, electronic or optoelectronic multiplexor switching using optical switches or so forth is contemplated instead of mechanical switching. Still further, if a separate analyzer is provided for each channel (that is, for each optical fiber 12), the acquisition of all channels can be done substantially simultaneously without channel switching.

With reference to FIG. 4, the optical testing apparatus of FIGS. 1-3 can be used in various ways. FIG. 4 shows one usage, suitable for characterizing color parameters (e.g., color temperature or corrected color temperature (CCT), color point or ccx and/or ccy parameters, color rendition index (CRI), or so forth for the illustrated phosphor covered dome 20 under test, or of a light source using such a dome such as is described for example in U.S. Pat. No. 7,224,000. If only the dome 20 is being tested, rather than the complete light source, then the light source 22 is suitably included as part of the test apparatus to enable excitation of the phosphor layer 20b. In the approach shown in FIG. 4, a spectrum is measured 50 for a first channel, that is, for a first one of the optical fibers 12. The spectrum is analyzed 52 to derive one or more parameters of interest, such as CCT, ccx, ccy, CRI, or so forth. At a looping point 54, the operations 50, 52 are repeated for each channel, that is, for each of the optical fibers 12. (If each channel is provided with its own spectrometer, then the spectra for all channels can be acquired in parallel, and the looping 54 can be omitted). The results are then output 56, for example as a graph plotting the parameters as a function of angular position along a selected arc, or as a two-dimensional map or image, such as a projection, showing the values across the surface of the dome 20, or as a three-dimensional rendering of the dome 20 color-coded or grayscale-coded to represent the computed parameter, or so forth. Such display or displays are suitably shown on the display of the illustrated computer-based controller 46, or can be printed or so forth. In other embodiments, the output operation 56 may output a single value, such as a binary "yes" or "no" decision as to whether the dome 20 under test meets a quality control criterion respective to uniformity of the CCT, CRI, or other measured parameter or parameters.

With reference to FIG. 5, another usage of the optical testing apparatus of FIGS. 1-3 is described. This usage measures uniformity of the phosphor layer 20b by measuring the absorption of the phosphor layer 20b rather than relying upon excitation of the phosphor layer 20b. In this embodiment, the light source 20 emits at a longer wavelength (i.e., lower photon energy) than a maximum wavelength (e.g., minimum photon energy) for exciting the phosphor component or components of the phosphor layer 20b. For example, if the phosphor layer 20b is designed to be excited by blue, violet, and/or ultraviolet light, the light source 20 may suitably emit yellow, red, or infrared light. The emitted light passes through the phosphor layer 20b and the cover 20a, but with some attenuation from absorption in the phosphor layer 20b. This absorption depends upon the thickness and density or composition of the phosphor layer 20b, which may vary spatially across the dome 20 (typically, characterizing such variation is an object of the test). Thus, in regions where the phosphor layer 20b is relatively thicker and/or more dense, more emitted light will be absorbed and the transmitted light intensity detected by the proximate collection end 14 will be relatively reduced. In the approach shown in FIG. 5, the channel intensities are measured 60 without the dome 20 loaded. These measurements 60 provide the baseline, or in other words identify the light intensity with no absorption by the dome 20. The user is then prompted 62 to load the dome 20 or other device under test. For example, the prompting 62 can comprise a textual prompt shown on the display of the illustrated computer-based controller 46. The prompting operation 62 is suitably terminated when the user pressed a "continue" button or the like on a keyboard of the illustrated computer-based controller 46, or may in other embodiments be terminated when a sensor (not shown) in the test apparatus detects the loaded dome 20. The channel intensities are measured 64 with the dome 20 loaded. One or more absorption parameters are computed 66 for the dome 20 or other optical component of interest under test disposed between the light source 22 and the collection ends 14 of the optical fibers 12. For example, in one illustrative embodiment, the absorption of each channel is modeled as $I_c/I_{co}=\exp(-q_c \cdot d_c)$ where $I_{co}$ is the intensity of a channel indexed "c" without the dome 20 loaded as measured in the operation 60, $I_o$ is the intensity of the channel indexed "c" with the dome 20 loaded as measured in the operation 64, $d_c$ is the thickness of the phosphor layer 20b proximate to the collection end 14 corresponding to the channel indexed "c", and $q_c$ is an effective phosphor weight or density parameter (i.e., an effective absorption coefficient) for the phosphor layer 20b proximate to the collection end 14 corresponding to the channel indexed "c". The aforementioned model can be manipulated by taking a $-\ln(\ )$ operation to yield $q_c \cdot d_c = -\ln(I_c/I_{co})$. Thus, from the light intensity parameters $I_c$, $I_{co}$ measured in respective acquisition operations 64, 60, a parameter $q_c \cdot d_c$ corresponding to an optical thickness of the phosphor layer 20b can be computed. In some embodiments, the acquisition operations 60 are contemplated to be omitted, and the parameter $I_{co}$ assumed to be constant for all channels, or taken from earlier measurements of the form of measurements 60, or computed from first principles based on an expected emission distribution of the light source 22, or so forth. The results are then output 68, for example as a graph plotting the optical thickness $q_c \cdot d_c$ as a function of angular position along a selected arc, or as a two-dimensional map or image of the optical thickness parameter $q_c \cdot d_c$, such as a projection, showing the values across the surface of the dome 20, or as a three-dimensional rendering of the dome 20 color-coded or grayscale-coded to represent the computed optical thickness $q_c \cdot d_c$, or so forth. Such display or displays are suitably shown on the display of the illustrated computer-based controller 46, or can be printed or so forth. In other embodiments, the output operation 68 may output a single value, such as a binary "yes" or "no" decision as to whether the dome 20 under test meets a quality control criterion respective to uniformity of the optical thickness $q_c \cdot d_c$.

FIGS. 4 and 5 merely provide illustrative examples of some applications of the apparatus of FIGS. 1-3. Other parameters that may be measured and spatially mapped or otherwise characterized include peak emission wavelength for a light source under test, light spatial light distribution of a refractive lens, uniformity produced by a diffusing frosted glass cover, or so forth.

With reference to FIG. 6, the test apparatus of FIG. 1, including the hemispherical support member 10 and fibers 12, is used to test a bare light emitting diode chip 80 mounted on the substrate 28. In this embodiment, the collection end-to-device under test is substantially larger, and non-uniform, as compared with the measurement of the phosphor covered dome 20 shown in FIG. 1. Accordingly, the measurements performed in the configuration of FIG. 6 are far field measurements, or at least an intermediary between far field and near field with a high degree of far field character. In some embodiments, the chip 80 may include a phosphor coating, and may for example be a white LED constructed as a blue-emitting chip covered by a yellow or yellowish orange phosphor, the combination of blue direct light and converted yellow or yellowish orange light being an approximation of white light. In such an embodiment, the test apparatus may, for example, measure the spatial distribution of the blue and yellow or yellowish orange components by measuring the intensities of the blue and yellow or yellowish orange intensity peaks.

In some embodiments, the light produced by the chip 80 or other light source under test may not be directly detectable by the analyzer 44. For example, the chip 80 may emit ultraviolet light, while the analyzer 44 may in this embodiment be sensitive only to visible light. In such a situation, it is contemplated to include a phosphor-based conversion element or substance on or in the collection ends 14 of the optical fibers 12, in the bulk of the optical fibers 12, or on or in the output ends 34. For example, if each fiber 12 has the same length and the same concentration of a phosphor conversion element embedded in the optical core, then the conversion efficiency of ultraviolet light passing through the fibers 12 will be nearly the same for each optical fiber 12, and the analyzer 44 can then detect the converted light. An optical testing apparatus comprises: a plurality of optical fibers having collection ends arranged to simultaneously view an examination region from a plurality of different angles, wherein the collection ends of the fibers include a material that generates second light responsive to at least a light of interest.

Still further, although not shown, it is contemplated to perform reflection measurements by injecting test light into the output end 34 of an optical fiber and detecting resultant luminescence produced by the phosphor covered dome 20, or detecting reflected light produced by a hemispherical reflecting mirror (not shown) or so forth. Optical components such as a dichroic mirror can be used to separate the injected excitation light from the resulting luminescence or reflected light.

Figure 7:
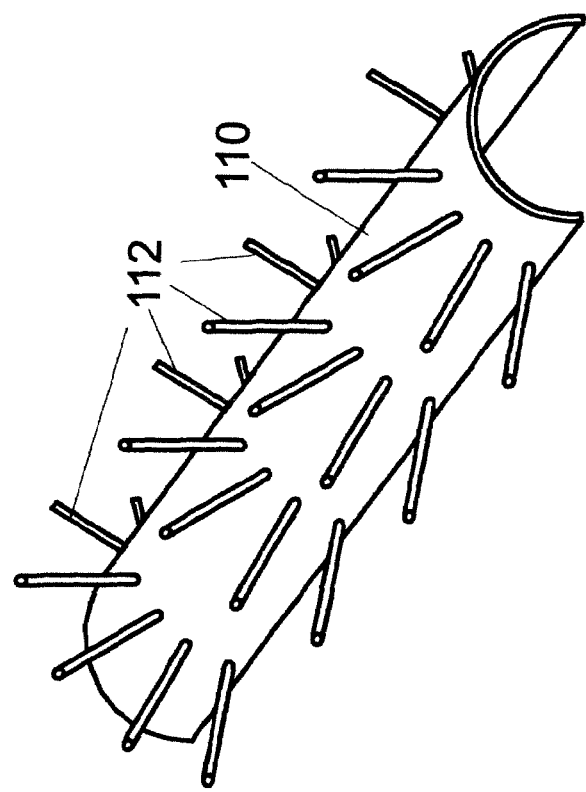
FIG. 7 diagrammatically depicts a sectional slice view of a support member for the collection fiber ends with portions of some of the collection optical fiber ends, designed to characterize a linear light source or linear optical component or portion of such linear light source or optical component.

With reference to FIG. 7, it is to be appreciated that the collection ends of the fiber, and the supporting member, can have geometries other than the heretofore illustrated hemispherical geometry. As an illustrative example, FIG. 7 shows the collection end of a test apparatus that includes a semi-cylindrical support member 110 suitable for supporting optical fibers 112 to view a cylindrical examination region. The collection end shown in FIG. 7 is suitable, for example, to test a cylindrical light source such as that shown in FIG. 6 of U.S.

Pat. No. 7,224,000 or to test the phosphor coated cylindrical cover component of that light source. The collection end shown in FIG. 7 is also suitable for testing other linear light sources such as LED lighting strings that are formed by mounting LED modules to a flexible cable. The collection end shown in FIG. 7 is also suitable for testing a cylindrical lens, or other elongated light sources or optical components.

Figure 8:
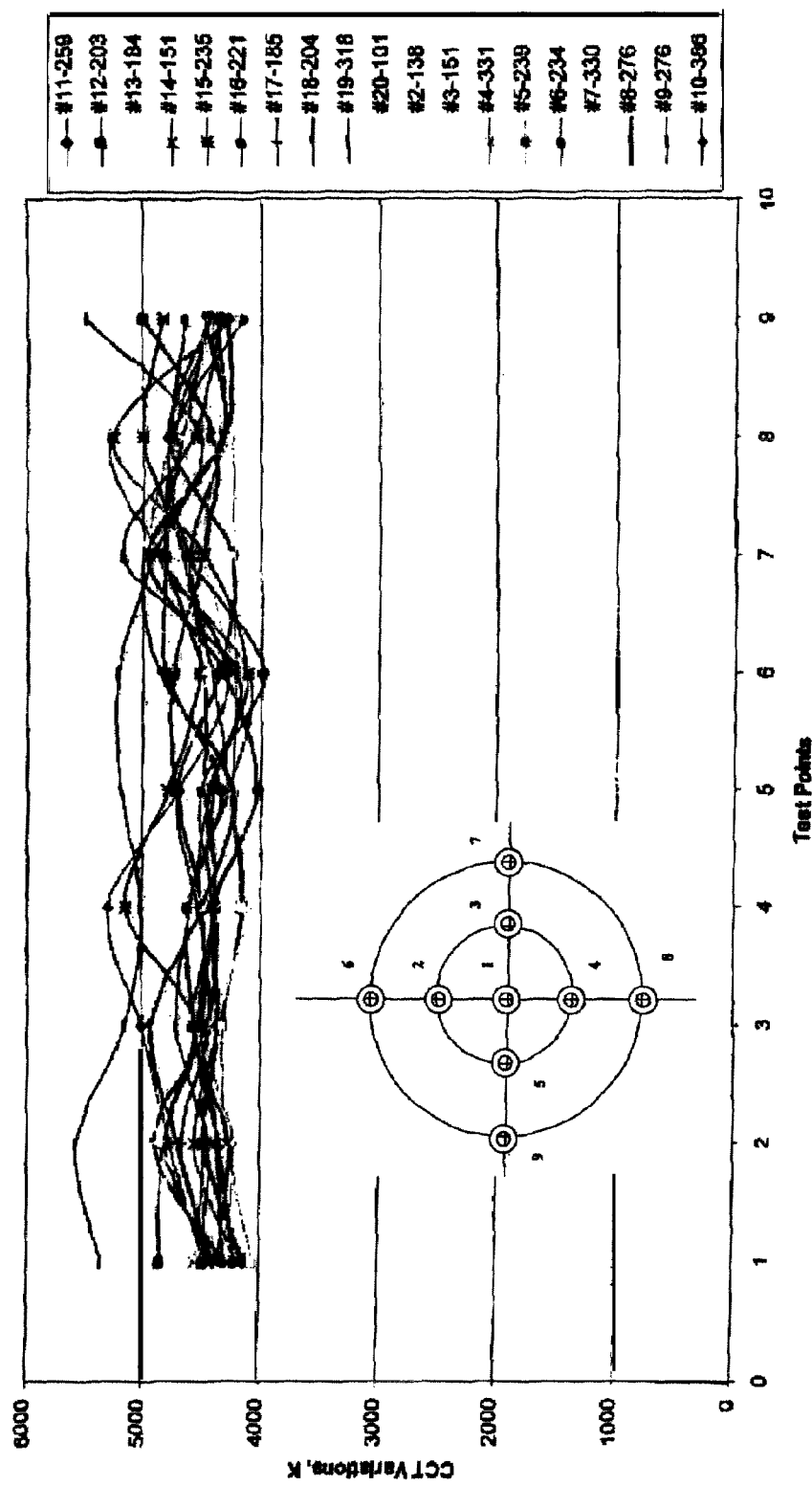
FIG. 8 shows corrected color temperature (CCT) data acquired from a set of phosphor coated hemispherical domes.

FIG. 8 shows corrected color temperature (CCT) data acquired from a set of phosphor coated hemispherical domes. Inset diagrammatically depicts an overhead view of the support member of the test apparatus with the locations of the nine optical fiber ends diagrammatically indicated. The acquisition used a collection portion of the test apparatus substantially similar to that of FIGS. 1-3 except that it included only nine collection ends arranged as depicted in the inset of FIG. 8. The support member was a hemispherical aluminum shell with openings for receiving the nine collection ends. The inside surface of the hemispherical aluminum shell was anodized to enhance light absorption and suppress light reflection by the inner surface.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The following listing of claims is illustrative of some disclosed embodiments. The listing of claims is illustrative, and is not intended to limit the scope of patentable subject matter disclosed herein.

The invention claimed is:

1. An optical testing apparatus comprising:
   a plurality of optical fibers, each optical fiber having a collection end in optical communication with an output end; and
   a support member supporting the collection ends of the optical fibers so as to simultaneously view an examination region from different angles.

2. The optical testing apparatus as set forth in claim 1, wherein each optical fiber of the plurality of optical fibers further has an output end in optical communication via the fiber with the collection end, the optical testing apparatus further comprising:
   an optical multiplexor transmitting light from a selected output end of the plurality of optical fibers.

3. The optical testing apparatus as set forth in claim 2, further comprising:
   an analyzer optically coupled with the optical multiplexor to receive transmitted light from the selected output end, the analyzer configured to generate at least one datum based on the received transmitted light.

4. The optical testing apparatus as set forth in claim 3, further comprising:
   a controller configured to cause the optical multiplexor to transmit light from different output ends of the plurality of optical fibers to the analyzer at different times.

5. The optical testing apparatus as set forth in claim 4, wherein the controller is further configured to perform data processing on the data generated by the analyzer based on the light from the different output ends.

6. The optical testing apparatus as set forth in claim 4, further comprising:
   a light source disposed in the examination region, the controller being further configured to perform data processing on the data generated by the analyzer to compute an absorption parameter for an optical component of interest disposed between the light source and the collection ends of the optical fibers.

7. The optical testing apparatus as set forth in claim 3, wherein the analyzer comprises an optical detector.

8. The optical testing apparatus as set forth in claim 3, wherein the analyzer comprises a spectrometer.

9. The optical testing apparatus as set forth in claim 1, wherein a surface of the support member facing the examination region is substantially non-reflective at least for light of interest.

10. An optical testing apparatus comprising:
    a plurality of optical fibers having collection ends arranged to simultaneously view an examination region from a plurality of different angles.

11. The optical testing apparatus as set forth in claim 10, wherein the collection ends span an angular range of interest.

12. The optical testing apparatus as set forth in claim 10, wherein the collection ends span a solid angular range of interest.

13. The optical testing apparatus as set forth in claim 10, wherein the collection ends define at least a portion of a sphere, the examination region being disposed at a center of the defined sphere.

14. The optical testing apparatus as set forth in claim 13, wherein the collection ends define a hemisphere, the examination region being disposed at a center of the defined hemisphere.

15. The optical testing apparatus as set forth in claim 13, further comprising:
    a support member including a wall substantially coinciding with the defined portion of the sphere, the wall supporting the collection ends of the optical fibers so as to simultaneously view the examination region from the plurality of different angles.

16. The optical testing apparatus as set forth in claim 10, further comprising:
    a support member including a support wall supporting the collection ends of the optical fibers so as to simultaneously view the examination region from the plurality of different angles.

17. The optical testing apparatus as set forth in claim 16, wherein a surface of the support wall facing the examination region is substantially optically absorbing at least for light of interest.

18. The optical testing apparatus as set forth in claim 10, wherein the collection ends of the fibers include a material that generates second light responsive to at least a light of interest.

19. The optical testing apparatus as set forth in claim 10, wherein the plurality of optical fibers further have output ends in optical communication with the collection ends via the optical fibers, the optical testing apparatus further comprising:
    an analyzer configured to generate at least one datum per collection end based on light received from a corresponding output end.

20. The optical testing apparatus as set forth in claim 19, wherein the analyzer measures intensities of light received from the corresponding output ends.

21. The optical testing apparatus as set forth in claim 19, wherein the analyzer measures color parameters for light received from the corresponding output ends.

22. The optical testing apparatus as set forth in claim 19, wherein the analyzer measures corrected color temperatures for light received from the corresponding output ends.

23. The optical testing apparatus as set forth in claim 19, further comprising:
a light source disposed in the examination region, the analyzer measuring an intensities of light received from the corresponding output ends and computing absorption parameters based on the measured intensities.

24. The optical testing apparatus as set forth in claim 23, wherein the collection ends define at least a portion of a sphere, the light source being disposed at a center of the defined sphere.

25. The optical testing apparatus as set forth in claim 24, wherein the light source generates light that is substantially independent of angular direction at least within the defined portion of the sphere.

26. The optical testing apparatus as set forth in claim 25, wherein the light source comprises:
a light emitting semiconductor device;
a light-transmissive encapsulant substantially surrounding the light emitting semiconductor device; and
optical dispersion particles dispersed in the light-transmissive encapsulant.

27. An optical testing apparatus comprising:
a plurality of optical fibers, each optical fiber having a collection end, the collection ends of the optical fibers arranged in fixed spatial relationship respective to one another to simultaneously view an examination region from different angles.

28. An optical testing apparatus comprising:
a plurality of optical fibers, each optical fiber having a collection end, the collection ends of the optical fibers arranged in fixed spatial relationship respective to one another and further arranged to conform with a surface whose light output is to be measured.

29. The optical testing apparatus as set forth in claim 28, wherein the collection ends are arranged about two millimeters or less away from the surface whose light output is to be measured whereby the collection ends acquire near field light output measurements.

30. The optical testing apparatus as set forth in claim 28, wherein the surface whose light output is to be measured is hemispherical.

31. The optical testing apparatus as set forth in claim 28, further comprising:
a support member supporting the collection ends in the fixed spatial relationship respective to one another.

32. The optical testing apparatus as set forth in claim 31, wherein the support member substantially blocks outside light from reaching the surface whose light output is to be measured.

33. The optical testing apparatus as set forth in claim 31, wherein a surface of the support member facing the surface whose light output is to be measured is substantially absorbing at least for light of interest.

* * * * *